(12) United States Patent
Saha et al.

(10) Patent No.: US 6,291,233 B1
(45) Date of Patent: Sep. 18, 2001

(54) AGB PROCESS FOR INTEGRATED MULTIMEDIA TREATMENT USING BIO-SORPTION

(76) Inventors: Anuj K. Saha, 610 Spring Creek La., Martinez, GA (US) 30907; Amitava Sarkar, 203 Highlands Bluff Dr., Cary, NC (US) 27511

( * ) Notice: Subject to any disclaimer, the term of this patent is extended or adjusted under 35 U.S.C. 154(b) by 0 days.

(21) Appl. No.: 09/148,005

(22) Filed: Sep. 4, 1998

(51) Int. Cl.⁷ .................................................. A61L 9/01
(52) U.S. Cl. ................ 435/266; 435/294.1; 210/601; 210/610; 210/617; 210/629; 210/631
(58) Field of Search ............................ 435/262.5, 266, 435/298.1, 299.1, 294.1; 210/610, 611, 616, 617, 629, 631

(56) References Cited

U.S. PATENT DOCUMENTS

| | | | |
|---|---|---|---|
| 4,168,050 | 9/1979 | Serfling et al. ..................... 210/12 |
| 4,662,900 | * 5/1987 | Ottengraf ............................ 55/90 |
| 4,810,385 | * 3/1989 | Hater et al. ....................... 210/606 |
| 5,169,782 | 12/1992 | Murphy et al. ..................... 435/312 |
| 5,501,718 | 3/1996 | Bandurski ............................. 71/9 |
| 5,503,738 | * 4/1996 | DeFilippi et al. ................. 210/150 |
| 5,562,588 | 10/1996 | Higgins ............................. 588/256 |
| 5,580,770 | * 12/1996 | DeFilippi ........................... 435/180 |
| 5,656,486 | 8/1997 | Daniels ............................ 435/252.4 |
| 5,670,046 | 9/1997 | Kimmel ............................. 210/602 |
| 5,858,768 | * 1/1999 | Bonnin et al. ..................... 435/266 |
| 5,869,323 | * 2/1999 | Horn ................................. 435/266 |
| 6,010,900 | * 1/2000 | Cherry .............................. 435/266 |
| 6,087,159 | * 7/2000 | Finn ............................... 435/299.1 |
| 6,100,081 | * 8/2000 | Buelna ............................. 435/266 |

* cited by examiner

Primary Examiner—David A. Redding
(74) Attorney, Agent, or Firm—Dority & Manning, PA

(57) ABSTRACT

An integrated treatment process and apparatus is provided for removing selected contaminants from both liquid and gaseous waste streams. A multistage separation and bio-oxidation substrate is provided in a column through which the contaminants are passed. The substrate components provide absorption, adsorption, ion exchange, solubility, and bio-degradation qualities to the column to effectively separate and destroy a wide range of contaminants in industrial waste streams.

9 Claims, 5 Drawing Sheets

Schematic for The AGB Process Using BIO-SORPTION

Schematic for The AGB Process
Using BIO-SORPTION

Table - 2

Performance Data for Removal of VOC* Mixtures

| Influent (relative ppb) | Effluent (relative ppb) | % Removal |
|---|---|---|
| 125200 | 4400 | 96.49 |
| 421250 | 1192 | 99.72 |
| 913520 | 58 | 99.99 |
| 203000 | 1700 | 99.16 |
| 230000 | 174 | 99.92 |
| 147700 | 10 | 99.99 |
| 2700 | 127 | 95.30 |
| 1141100 | 16840 | 98.52 |

\* The VOC Mixtures Contain Such Compounds as Aromatics, Chlorinated Solvents, Aldehydes, Ketones and Alcohols.

Fig. 2

TABLE - 3

Performance Data for Removal of Hazardous Air Pollutants (HAPs) Using Multistages (3 stages) of BIO-SORPTION media

| Types of HAPs | Inlet Conc.$^n$ (mg/m$^3$) | Exit Conc.$^n$ (mg/m$^3$) | Removal Efficiency | $CO_2$ Conc.$^n$ in the exit stream (mg/m$^3$) |
|---|---|---|---|---|
| n-hexane | 100 | BDL (Detection Limit in mg/m$^3$) | >99% | 325 |
| | | | | |
| Trichloroethylene | 38 | BDL | >99% | |
| | | | | |
| n-hexane | 130 | BDL | >99% | 880 |
| | | | | |
| Toluene | 150 | BDL | >99% | |
| | | | | |
| Xylene | 120 | BDL | >99% | 520 |
| | | | | |
| Perchloro Ethylene | 200 | BDL | >99% | |

Fig. 3

TABLE - 4

Performance Data for Removal of Light Hydrocarbon\*
Mixtures Using One Stage of BIO-SORPTION Media

| Inlet Concentration (mg/m$^3$) | Exit Concentration (mg/m$^3$) | Removal Efficiency (%) |
|---|---|---|
| 3,111.11 | 101.58 | 96.73 |
| 3,283.45 | 105.50 | 96.79 |
| 2,389.75 | 46.19 | 98.07 |
| 1,434.63 | 50.27 | 96.50 |
| 1,379.21 | 53.39 | 96.13 |
| 1,007.15 | 41.17 | 95.91 |
| 918.79 | 35.33 | 96.15 |
| 596.36 | 11.60 | 98.05 |
| 488.54 | 13.76 | 97.18 |
| 290.18 | 7.71 | 97.34 |
| 664.32 | 18.09 | 97.28 |
| 281.22 | 9.16 | 96.74 |
| 328.80 | 35.9 | 89.08 |
| 445.55 | 2.87 | 99.36 |
| 413.88 | 23.29 | 94.73 |

\*Light Hydrocarbon Mixtures consist of Pentane and Butane.

Fig. 4

Table - 5

Reduction in the VOC Concentration (as measured by the TOC and TOX) in the waste water stream by concurrent stripping and Bio-odixation

| Analyses | Initial Concentration (mg/lit) | Final Concentration (mg/lit) | Removal Efficiency (%) |
|---|---|---|---|
| TOC | 13,700 | 1000 | 92.7 |
| TOX | 990 | 19 | 98.08 |
|  |  |  |  |
| TOC | 12,500 | 3500 | 72.0 |
| TOX | 1,050 | 160 | 84.76 |
|  |  |  |  |
| TOC | 14,600 | 2,100 | 85.62 |
| TOX | 850 | 93 | 89.06 |
|  |  |  |  |

TOC = Total Organic Carbon

TOX = Total Organic Halides

Fig. 5

AGB PROCESS FOR INTEGRATED MULTIMEDIA TREATMENT USING BIO-SORPTION

FIELD OF THE INVENTION

This invention is directed towards a biological treatment system which is suitable for removing and/or degrading a wide variety of contaminants. The treatment system is able to effectively handle volatile organic compounds (VOCs), volatile organic hazardous air pollutants (VOHAPs), light to middle weight petroleum distillates, and a variety of other organic pollutants. The treatment system is able to effectively treat these pollutants from both gas and liquid waste streams.

BACKGROUND OF THE INVENTION

The Clear Air Act Amendment (CAAA) of 1990 requires industrial and commercial facilities to control emissions of a wide range of Volatile Organic Hazardous Air Pollutants (VOHAP), Volatile Organic Compounds (VOCs), particulates, and gases causing acid rain and precursors for depletion of stratospheric ozone layers. The CAAA contains 10 titles, each addressing specific guidelines and compliance rules for each area of concern.

Title III of the CAAA requires all industrial and commercial facilities located within "non-attainment" areas to reduce their VOC emissions below the threshold value. The term "non-attainment" means areas or metropolis which have not met the National Ambient Air Quality Standards (NAAQS) in terms of ozone, $NO_x$ and particulate matter.

Title III of the CAAA requires 174 source categories/industry groups requiring control of emissions of 188 Hazardous Air Pollutants (HAPs). Each source category is a specific type of industrial or commercial operations which emits pollutants to the ambient air. A facility becomes a major source when it emits over 10 tons per year of a single HAP, or over 25 tons per year of all HAPs combined into the air.

Further, industry and regions in all parts of the country are undertaking aggressive efforts to limit the release of all types of hazardous materials. Public reporting criteria have increased the scrutiny and public pressure on all industries which generate or release toxic or hazardous materials. As a result, many industries are undertaking renewed efforts to control the production or release of hazardous materials.

Title III of the CAAA exposes numerous industrial emission sources which were not regulated or controlled before. These sources require installation of emission control technologies. At present, many industrial and commercial facilities have turned to aqueous scrubbing techniques or thermal oxidation processes such as incineration to curb their emissions. Incineration, while achieving a high destruction efficiency, is expensive in terms of capital and operating costs. Further, off-site incinerators which may serve many industries, face ever more opposition from citizens who have health concerns over incinerations efficacy and safety. Incineration of halogenated VOCs and HAPs are also extremely corrosive to the contact parts and may produce highly toxic substances such as dioxin.

Aqueous scrubbing technologies for VOC control do not have the corrosion or toxic byproduct formation problems like the incineration technologies. However, the scrubbers can only be effective for hydrophilic VOCs and HAPs and also require effective means for disposal of scrub water. For hydrophobic contaminants, such as the majority of the regulated VOCs and HAPs, aqueous scrubbing is generally not effective for emission control.

Both the incinerator and the scrubber technologies are not well suited or compatible for accepting and treating facility wastewater. In other words, both the technologies are applicable for treatment of only air streams. For hydrophilic contaminants, scrubbers could potentially use facility wastewater. However, since scrubbers merely transfer the contaminants from the gaseous to the liquid phase, and do not destroy, degrade or decompose, other forms of treatment operation(s) are necessary to dispose or discharge the scrub water.

SUMMARY OF THE INVENTION

It is an object of this invention to provide a material and process which effectively treats a diverse group of pollutants.

It is a further object of this invention to provide a material and a process which can effectively remove pollutants from gaseous as well as liquid waste streams.

It is a further and more particular object of this invention to provide an apparatus and process which uses selected sorbents along with bio-solids to first remove (separate/concentrate) and to then degrade contaminants from a waste stream.

These and other aspects of the invention are made possible by features of applicants' AGB (Ashalata, Gostha Bihari) Process which involves the use of a novel bio-reactor utilizing microorganisms embedded in selective sorbents to sorb and bio-oxidize VOCs and HAPs from facility exhausts. As used herein, the term "sorb" includes both adsorptive and absorptive capabilities. In a single operative step, a multistage unit provides for the initial removal and subsequent degradation/detoxification of organic contaminants by utilizing bio-solids, selective sorbents, moisture and micro-nutrients.

Wastewater may be used to provide the moisture and part of the organic (carbon) food sources for the bio-reactor. The wastewater may be sprayed directly over the bio-solids and the sorbents. Depending on its characteristics, the wastewater may be pretreated or conditioned so as to be conducive to the bio-solids and the sorbents. A facilities' gaseous emissions are then passed through a multistage sorption unit of the bio-reactor. Each stage of the sorption unit is stacked with a blended mixture of selective sorbents and bio-solids. Depending on the characteristics of the contaminants, the mixture may additionally contain pH buffering ingredients, surface active agents and boosters to enhance selective metabolic activities. The sorbents and the bio-solids are kept moist by adding preconditioned wastewater in the form of fine mists or globules.

As the contaminated emissions passes through the stages of the bio-reactor, the selective sorbents capture the contaminants. Once captured, the contaminants provide a metabolic source for the microorganisms. Oxygen and micronutrients such as nitrogen (N), phosphorous (P) and potassium (K) are supplied via the wastewater and aids in the process of bioxidation or metabolization which converts the contaminants to $CO_2$, $H_2O$ and trace quantity of mineral salts. The mineral salts are only formed for contaminants containing atoms other than carbon (C), oxygen (O) and hydrogen (H). The treated exhaust exiting the last stages essential contains air, $CO_2$, $H_2O$ vapor, and ultra trace quantities of non-reacted contaminants.

The integrated AGB Process collects the facility wastewater and performs pretreatment or conditioning. The conditioning entails reducing the concentrations of the wastewater contaminants to a level which enhances the subsequent injection into the sorption unit of the bio-reactor. The primary unit operation for conditioning is a stripper cum bio-reactor vessel where the wastewater is pulsated in the presence of sorbents and bio-solids similar to those used in the sorption unit. The pulsation treatment allows the microbes sufficient time to bio-oxidize and reduce the wastewater contaminant concentration. The pulsation also strips (dislodges) the volatile contaminants such that it can be combined with the facility exhaust for passage through a BIO-SORPTION unit. Moreover, the pulsation also suspends and grows the microbes in an aerobic state and stimulates the growth of microbes most conducive for bioremediation of the contaminants.

One part of the wastewater, after pulsation, is generally filtered before injection into the bio-treatment unit. Following filtration, the filtered wastewater is introduced to the bio-treatment unit along with the gaseous emissions. The other part of the pretreated wastewater can either be discharged or reused within the facility.

BRIEF DESCRIPTION OF THE FIGURES

FIG. 2 is a chart entitled "Table-2" showing the performance data for removal of VOC mixtures.

FIG. 3 is a chart entitled "Table-3" showing the performance data for removal of hazardous air pollutants.

FIG. 4 is a chart entitled "Table-4" showing the performance data for removal of light hydrocarbon mixtures.

FIG. 5 is a chart entitled "Table-5" showing the reduction in the VOC concentration.

DESCRIPTION OF THE PREFERRED EMBODIMENTS

Figure 1:
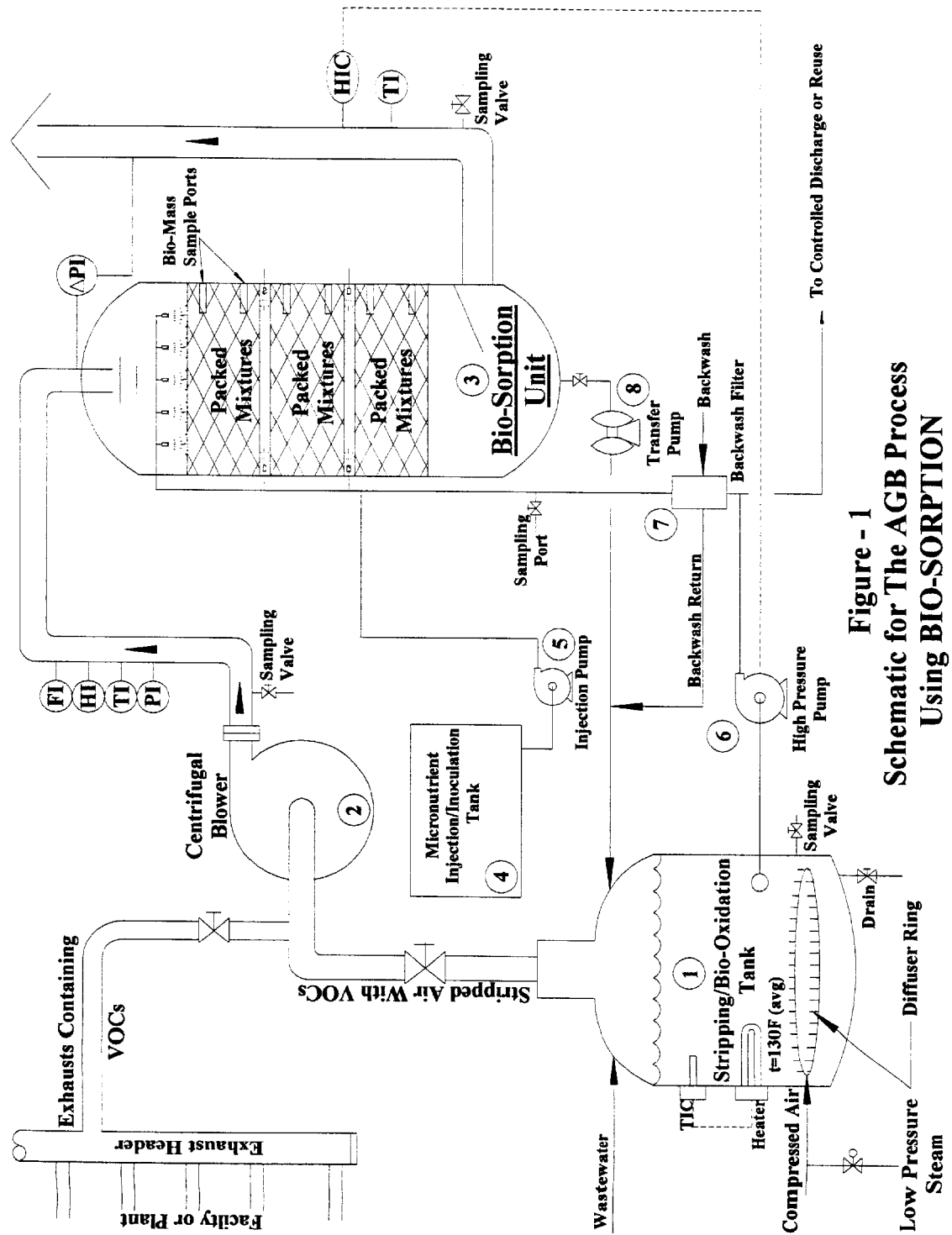
FIG. 1 is a schematic view of the AGB Process.

For a better understanding of the invention, reference may be made to the embodiments exemplary of the invention shown in accompanying FIG. 1, which is a schematic of the AGB Process.

Referring to FIG. 1, the exhausts from a production or manufacturing facility containing VOCs and HAPs are drawn by a high pressure centrifugal blower (2). The exhausts can be combined with the stripping air emanating from the stripping/bio-oxidation tank (1). Tank (1) receives facility or plant wastewater containing VOCs and HAPs. Depending on the type of contaminants, bio-solids are periodically added to tank (1) for bio-oxidation. Tank (1) is equipped with devices for injection of compressed air and/or low pressure steam to facilitate dislodging, stripping and transport of the contaminants to the suction side of blower (2). Tank (1) is also equipped with a device for temperate indication and control to facilitate effective stripping and concurrent bio-oxidation. Tank (1) is operated within a temperature range of 80° F.–150° F. The diffuser ring provides a mechanism for adding stripping fluids uniformly.

Blower (2) is powered with an electric motor to impart sufficient kinetic and pressure energies to overcome line losses and pressure drops. Blower (2) discharges the combined exhausts and the stripped air to a bio-treatment column known as the BIO-SORPTION unit (3). The BIO-SORPTION unit (3) is packed with three or more stages of mixtures of selective sorbents inert packing material and bio-solids. Each stage is maintained with a packing height of 2 ft. to 4 ft. The top of each stage is sprayed as needed with pretreated wastewater to maintain preferred moisture levels within the packed mixtures. Spraying is accomplished with several mist nozzles fed by the high pressure water pump (6). To protect the nozzles from clogging, the pretreated wastewater, before injection, is filtered using a backwash filter (7). From time-to-time, the backwater filter (7) is backwashed to remove solids which are returned to the tank (1).

The combined exhausts and the sprayed water mists flow concurrently through the packed mixtures in the BIO-SORPTION unit (3). During this flow passage, the contaminants present in the fluid streams are transferred to the mixtures by a combined mechanism of absorption, adsorption and solubilization. This combined mechanism provides the foundation for the bio-degradation/bio-oxidation of the organic contaminants. For inorganic contaminants (if present), this mechanism provides a means for binding and stabilization such that the contaminants are retained within the BIO-SORPTION unit (3).

The following Table-1 illustrates the various sorbents, inert materials, and bio-solids present in a typical packed mixture and their functionality in the above treatment process.

TABLE 1

| | Sorbents/Bio-solids/Inert | Particle Size | Functionality |
|---|---|---|---|
| A. | Natural zeolite, e.g., clinoptilolite, mordenite, chabazite, etc. | 2–4 mesh | Adsorbs light VOCs and light hydrocarbons. Binds (ion-exchanges) ammonia and heavy metals present in the fluid streams. Increases bed utilization, and aids in microbial growth and bio-oxidation. Increases bed porosity and reduces pressure drop. |
| B. | Cracked walnut shell | 2–4 mesh | Absorbs light hydrocarbons, oils and greases, and provides extended surface areas for microbial contact and growth. Increases bed porosity and reduces pressure drop. |
| C. | Activated carbon of vegetable or animal origin | 4–10 mesh | Adsorbs VOCs and HAPs and aids in bio-film oxidation. |
| D. | Crushed oyster shell | 5–10 mesh | Provides pH buffering for the packed mixtures by slowly releasing complex calcium bearing material. |
| E. | Calcined expanded clay | 2–4 mesh | An inert material, provides extended surfaces for the microbes to thrive and propagate. It also increases bed porosity and reduces pressure drop. |
| F. | Composted bio- | 100– | Absorbs and bio-oxidizes the organic contaminants in presence |

TABLE 1-continued

| Sorbents/Bio-solids/Inert | Particle Size | Functionality |
|---|---|---|
| solids (manures) from ruminant or poultry origin | 200 mesh | of moisture and micronutrients. May also provide some pH buffering for the packed material. |

Depending on the type of contaminants, the packed mixture may be prepared by tumbling a varied ratio of the above materials. However, for a common application of treating 300 ppm of HAPs such as toluene, xylene, hexane and trichloroethylene, the composition of the packed mixture is expected to be as follows:

| | |
|---|---:|
| A. Natural zeolite | 20% |
| B. Walnut shell | 20% |
| C. Activated carbon | 15% |
| D. Oyster shell | 5% |
| E. Calcined clay | 20% |
| F. Ruminant bio-solids | 20% |
| | 100% |

Before loading into the BIO-SORPTION unit (3), the above materials are premixed with hydrotropic surface active ingredients or surfactants such as DOWFAX hydrotrope. The surfactants are particularly important for the treatment of hydrophobic contaminants [light hydrocarbons, chlorinated organics], where the contaminant water solubilities are increased. An increase in the contaminant solubility increases the efficiency of the sorption process, thus increasing the bio-oxidation/bio-degradation efficiency as well.

The treated exhaust stream exits the BIO-SORPTION unit (3) along with the treated wastewater converted to the form of water vapor or humidity. The exit humidity of the exhaust is monitored and controlled by a controller (HIC), which controls the pressure pump (6). Any condensate generated within the BIO-SORPTION unit (3) is collected by transfer pump (8) and returned to tank (1).

Should the BIO-SORPTION unit (3) loose microbes or require a specific culture for bio-oxidation, tank (4) and pump (5) provide a mechanism for adding microbes or cultures to the stages within the BIO-SORPTION unit (3). The mechanism can also be used for addition of micronutrients to the stages, if it is so desired.

The AGB Process is shown to be effective for treatment and degradation of a wide variety of organic pollutants such as; alcohols, esters, aldehydes, ketones, aromatics, substituted aromatic and chlorinated compounds. Many of the pollutants that the AGB Process treat fall within the category of HAPs and VOCs. The AGB Process can also treat and degrade the light and middle distillate petroleum hydrocarbons, many of which are also listed VOCs. Table-3 and Table-4 show typical performance data for the AGB Process.

Table-4 essentially indicated that one stage of the BIO-SORPTION treatment can reduce the VOC concentration by over 90%. Table-3 shows that multistage BIO-SORPTION can remove and convert the HAPS with over 99% efficiency.

The reduction in off gas emissions and corresponding reductions in wastewater contaminants, as shown in Table-5, reflects more than a mere transfer of contaminants to the sorption materials. The sorption materials provide an environment where microorganisms can colonize the substrate and use the contaminants as a carbon or other metabolic source as evidenced by the formation of $CO_2$ measured in the exit stream (Table-3). In effect, the present invention first sequesters contaminants from the waste streams and secondly biologically oxidizes the contaminants to nonhazardous constituents.

Applicants' process and apparatus makes use of low-cost, readily obtainable sorption materials to achieve the contaminant removal and destruction. As many variations and modifications of applicants' invention will be apparent upon a reading of the disclosure and preferred embodiment, such variations and modifications fall within the spirit and scope of the invention as measured by the following appended claims.

What is claimed is:

1. A process for treating waste streams comprising:
   supplying a gaseous waste stream containing VOCs;
   moistening a biologically active column with a supply of wastewater, said wastewater being conditioned by pulsating said wastewater in the presence of sorbents and bio-solids, thereby bio-oxidizing microbes within the wastewater and further stripping volatile contaminants from the wastewater;
   passing said gaseous waste stream through said biologically active column of packing material;
   transferring said VOCs from said gaseous waste stream to said packing material;
   degrading said gaseous waste stream comprising VOCs and said wastewater contaminants by the bio-oxidation of microorganisms present within said packing material;
   and removing said degraded waste stream from said biologically active column;
   wherein said steps of supplying, passing, transferring, degrading and removing comprise the treating of said waste streams.

2. The process according to claim 1, wherein said column further comprises:
   said packing material comprising a mixture of zeolite, nut shells, activated carbon, oyster shell, calcined expanded clay, and composted bio-solids.

3. The process according to claim 2, wherein:
   said column contains pH buffering ingredients, surface active agents and boosters to enhance selective metabolic activities.

4. The process according to claim 2, comprising the additional step of:
   providing a population of a selected microorganisms to said column.

5. The process according to claim 2, comprising the additional step of:
   premixing said packing material with hydrotropic surface active ingredients or surfactants;

wherein said premixing aid in the treatment of hydrophobic contaminants where the contaminant solubilities are increased.

6. The process according to claim 5, wherein:

said surface active ingredients or surfactants are hydrotopes.

7. A system for treating waste streams comprised of:

a tank for stripping or bio-oxidizing VOCs;

a blower for discharging combined exhaust and stripped air from said tank to a bio-treatment column comprising a packing material for degrading said VOCs by bio-oxidation;

an injection pump for adding microbes or cultures to a plurality of column stages within said bio-treatment column; and a pump for feeding spray nozzles which supply and maintain pretreated wastewater to said packing material;

wherein said tank receives waste streams containing VOCs, said tank passing said waste streams to said blower, said blower discharging said waste streams to said bio-treatment column, said contaminants being passed to said bio-treatment column, said injection pump adding said microbes or cultures to different stages within said bio-treatment column, said pump feeding pretreated wastewater to said spray nozzles for misting said bio-treatment column, and said waste stream exiting said bio-treatment column as treated.

8. The process according to claim 1 wherein the packing material comprises:

an adsorbent having ion-exchange and sorption capabilities;

and organic absorbent;

a buffering agent;

an inert substrate for facilitating colonization and growth by microorganisms; and, a composted bio-solid.

9. The process according to claim 1 wherein said volatile contaminants stripped from said step of pulsating wastewater is added to said first gaseous waste stream.

* * * * *